Nov. 20, 1951  R. A. WITHROW ET AL  2,575,574
LOW-PRESSURE AND VACUUM RELIEF VALVE
Filed Nov. 2, 1946

*INVENTOR.*
RALPH A. WITHROW
R. E. COLVARD
BY
*Martin E Anderson*
ATTORNEY

Patented Nov. 20, 1951

2,575,574

UNITED STATES PATENT OFFICE 2,575,574

LOW-PRESSURE AND VACUUM RELIEF VALVE

Ralph A. Withrow, Denver, Colo., and Robert E. Colvard, Salt Lake City, Utah

Application November 2, 1946, Serial No. 707,414

4 Claims. (Cl. 137—53)

This invention relates to improvements in low pressure relief valves for gas systems.

In the transportation of gas through pipe lines, the gas is usually maintained under a high pressure to expedite the transfer of large volumes. At intervals along the pipe line, boosters are provided. Such boosters are operated by means of engines using gas from the pipe line as fuel.

The pressure in the pipe line may be very high, but, for the purpose of explanation it will be considered as five hundred pounds per square inch. The pressure of the gas admitted to the intake manifold of the gas engine is reduced to sixteen ounces or one pound per square inch. Such reductions are effected by means of ordinary reducing valves of well known construction. Since it is impractical to reduce a gas pressure from five hundred pounds per square inch to one pound per square inch with a single reducing valve, it is customary to provide a number of such reducing valves connecting them in series. The last pressure reducer of the series usually reduces the pressure to five pounds per square inch and the gas is then discharged into a surge chamber. A pipe extends from the surge chamber to the gas engine and in this pipe another reducer is connected, which reduces the pressure from five pounds to sixteen ounces. The last reducing valve is quite sensitive and if it should be subjected to pressures appreciably more than five pounds per square inch, the diaphragm would rupture, thereby permitting gas at a much higher pressure to enter the engine manifold.

In order to make the operation of such a reducing system and engine safe, it is necessary to provide the surge tank with a pressure relief valve of a very sensitive construction that will positively relieve any excessive pressure that might develop due to faults or breakage in the system.

It is the object of this invention to produce a pressure relief valve employing hydrostatic means for determining the pressure at which it operates and which, in addition to relieving excessive pressure, will also operate in a reverse direction in response to pressure below atmospheric.

Another object of this invention is to produce a pressure relief valve that shall have no relatively movable parts, with the exception of a quantity of mercury or other high density liquid positioned therein.

A further object is to provide a relief valve of the class described which can be readily adjusted so as to operate at any desired pressure.

A still further object is to produce a relief valve of the type described which shall be of a very simple construction and which can be designed to vary the pressure at which it operates to an accelerated or decelerated rate.

The above and other objects that may become apparent as this description proceeds are attained by means of a construction and an arrangement of parts that will now be described in detail and for this purpose reference will be had to the accompanying drawing in which the invention has been illustrated in its preferred form, and in which.

Figure 3:
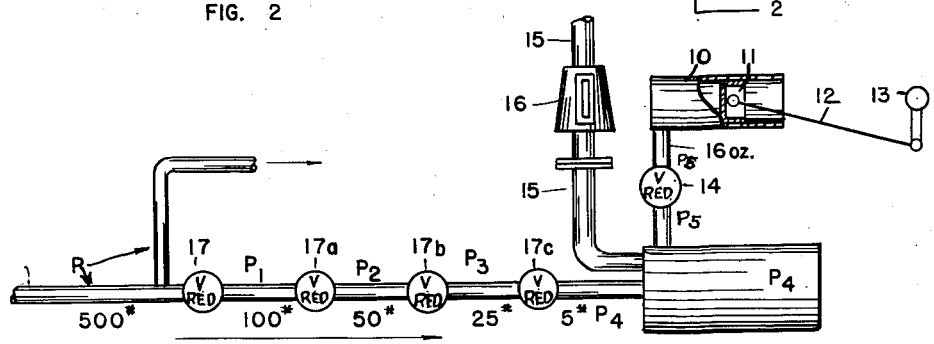
Figure 3 is a diametric or schematic representation of a system comprising an engine operated by gas taken from the high pressure gas pipe line.

Referring now to Figure 3 of the drawing, reference character P designates a high pressure portion of a gas pipe line, and for the purpose of this description the pressure in this part of the pipe will be considered as five hundred pounds per square inch, but it may be any other pressure that is employed in such a system.

Reference numeral 10 designates a gas engine having a piston 11, a connecting rod 12 and a crank shaft 13. This engine is constructed in the usual manner and has been shown diagrammatically in the drawing for the purpose of explanation only. The engine is provided with the ordinary carbureting mechanism and receives its gas from a surge tank which has been designated by reference character P4. A pipe P5 extends from the engine carbureter to the surge tank and positioned in this pipe is a reducing valve 14 that is designed to give a constant gas pressure of sixteen ounces in that portion of pipe P5 that connects with the carbureter. Connected with the surge tank is a pipe 15 that extends to the atmosphere or some other place and in this pipe a pressure relief valve 16, constructed in the manner which will shortly be described, is positioned. Relief valve 16 will function to let gas escape from the surge tank whenever it exceeds a predetermined pressure. Pipe line P will be considered as carrying a pressure of five hundred pounds per square inch and this is reduced by the first reducing valve 17 to one hundred pounds per square inch. The next reducing valve, 17a, delivers the gas at a pressure of fifty pounds per square inch. Reducing valve 17b reduces the gas to twenty-five pounds per square inch, and reducing valve 17c reduces it to five pounds per square inch. Of course it is to be understood that these pressures are merely illustrative.

If, for example, reducing valve 17a should break, gas would be delivered to the surge tank at twenty-five pounds per square inch, which, in turn, would be sufficient to rupture the diaphragm of reducing valve 14, thereby upsetting the operation of the engine. To assure that no danger would result from a temporary excess pressure in the surge tank, the relief valve that forms the subject of this invention and which has been designated by reference numeral 16, in Figure 3, is inserted in pipe 15. The construction of this relief valve will now be described.

Figures 1, 2:
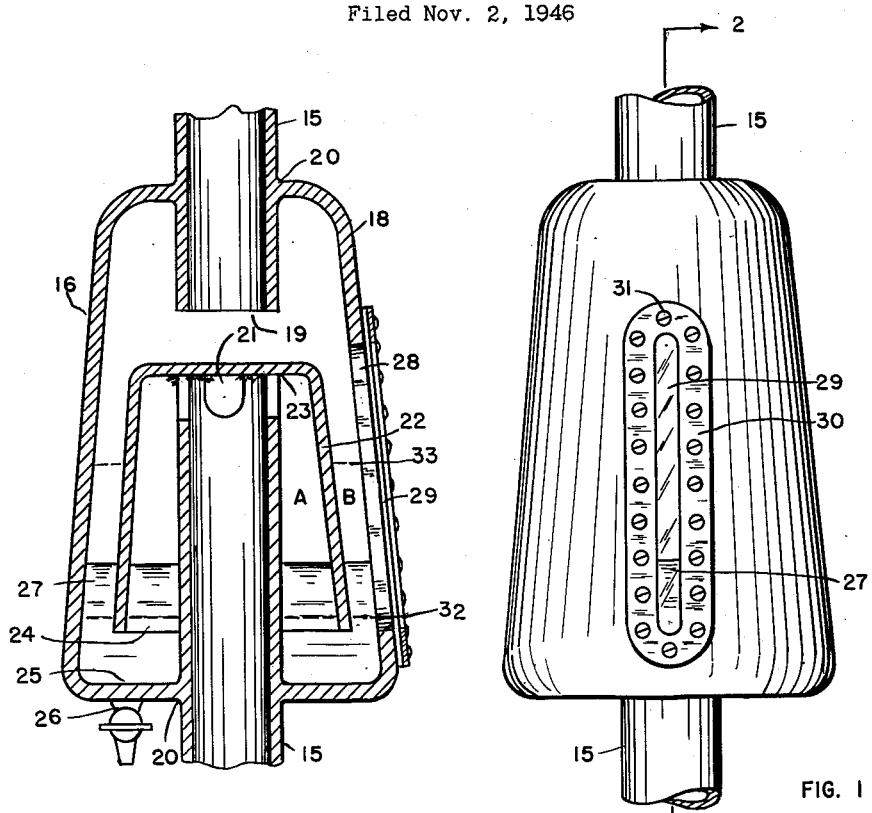
Figure 1 is a side elevation of the relief valve.
Figure 2 is a longitudinal diametrical section taken on line 2—2, Figure 1.

Referring to Figures 1 and 2, reference numeral 15 designates the pipe of the same number in Figure 3. The relief valve consists of an outer housing 18, which, in the present embodiment has been shown as frusto-conical and upwardly tapering. Pipe 15 extends axially through the housing, but is interrupted at the point designated by reference numeral 19, in Figure 2. The two sections of pipe 15 are welded to the housing along lines 20. Housing 18 may be made in two parts and the two parts autogenously welded after the valve parts have been assembled. In the drawing, however, they have been shown as they would appear after they have been welded. A welded construction is believed to be preferable because it prevents leaks and there is no particular need for opening this valve after it has once been assembled and for that reason the parts may be connected in the manner indicated.

The upper end of the lower section of pipe 15 is provided with a number of notches or openings 21. This pipe terminates at a suitable height within the housing, the height depending upon the nature of the liquid employed and the pressures to be guarded against. A cup 22 made from any suitable metal, is inverted over the upper end of the lower pipe section 15 and is preferably welded thereto along line 23. In any event the cup does not and should not be movable relative to the pipe on which it is supported. Cup 22 terminates along line 24 which may be a short distance above the upper surface 25 of the bottom of the housing. A petcock 26 is provided in the bottom to facilitate removing the liquid contained therein. In order to make the height of the liquid 27 visible, one side of the housing is provided with an elongated slot 28 that is covered by means of a glass plate 29 and this, in turn, is held in place by means of a metal ring 30 that is secured to the housing by means of screws 31. Suitable gaskets are provided, if necessary.

In the relief valve illustrated, liquid 27 will be considered as being mercury for the reason that this has a high specific gravity and does not evaporate.

Attention is called to the upwardly tapering construction shown in Figures 1 and 2.

Let us now assume that a pressure relief valve constructed in the manner shown in Figure 2, is connected with the discharge pipe 15 in the manner shown in Figure 3. The level of the liquid 27 is adjusted so that when the pressure in the surge tank is five pounds, the level of the liquid within the cup will be, for example, at that indicated by reference numeral 32, in Figure 2.

When the level inside the cup is depressed, the level in the annular space on the outside of the cup will, of course, be elevated and we will assume that with about five pounds per square inch in the surge tank, the level outside of the cup will be somewhere about that designated by reference numeral 33. If the pressure now increases sufficiently to depress the level inside of the cup to a point below the lower edge thereof, gas can escape from the inner chamber which has been designated by reference character A, pass underneath the rim of the cup and will then bubble upwardly through the mercury contained in chamber B. The pressure required to effect a release is, of course, directly proportional to the difference in the levels of the liquid in chambers A and B.

It is evident that if the cross sectional area of chamber A were exactly equal to the cross sectional area of chamber B, the level would rise in chamber B a distance equal to that which the level in chamber A is depressed. However, if the area in chamber A is twice as great as the cross sectional areas in chamber B, the level in chamber B will rise twice as fast as that in chamber A is falling. It will thus be seen that by proportioning the parts in such a way as to change the relative cross sectional areas of chambers A and B different characteristics of the relief valve will be produced.

Figures 4, 5:
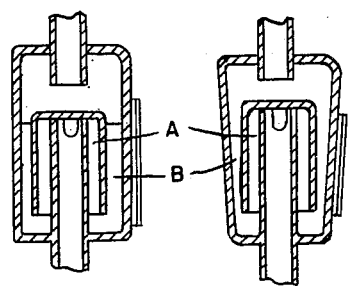
Figure 4 is a sectional view similar to that shown in Figure 1, but shows a slightly modified form of construction.
Figure 5 is a diametrical section showing another modification.

In Figure 4 a relief valve has been shown in which the area in chamber B is greater than that in chamber A, but both of these areas are the same at all vertical levels, whereas, with the construction shown in Figure 5, the cross sectional area of chamber B increases upwardly. It is evident that any desired arrangement and relative proportions can be utilized without departing from the invention and that the relief valve can therefore be designed to suit any special conditions that may arise which requires such peculiar characteristics to be provided.

In the above parts of the specification, the operation has been described in connection with an increased pressure in the surge tank, or in chamber A. This valve will also operate to relieve a vacuum, for example, if the pressure in surge tank P4 should fall below atmospheric, the level in chamber A would rise and the level in chamber B would fall and at a certain degree of vacuum, air would be permitted to enter from chamber B to chamber A. Such valves are useful in connection with large gas tanks or tanks for holding liquid such as gasoline or oil. If a vent is not provided in such tanks, then when liquid in withdrawn from the tank, the space above the liquid will increase in volume and reduce the pressure therein in such a manner as to interfere with the flow of liquid in response to gravity and if lowered sufficiently, the top of the tank may collapse because such tanks are of large diameter and present large areas.

Particular attention is called to the fact that cup 22 is not movable with respect to the other parts of the valve. This is believed to be an important distinction and produces a mode of operation that is entirely different from that of ordinary relief valves. As an illustration of an ordinary type of relief valve for a similar purpose, attention is called to U. S. Patent No. 1,440,297, granted December 26, 1922. In this patent member 37 moves upwardly or downwardly in the liquid depending upon the value of the pressure to which it is subjected. In applicant's device, however, cup 22 remains stationary and the adjustments can therefore not be accidentally varied or disturbed. Additional liquid can be introduced through the pipe 15, projecting from the top, or a suitable valve may be provided to permit liquid to be introduced. By means of the petcock 26, liquid can be withdrawn. Glass 29 can be provided with a scale that is calibrated in accordance with whatever units may be desired, for example, it may be calibrated to represent ounces of pressure or pounds at which the valve will operate to relieve the pressure in a container to which it is connected. By employing mercury the size of the apparatus can be maintained quite small and still handle a considerably higher pressure. By substituting for mercury any other liquid having a smaller specific gravity, a more delicate device results. By increasing the height, the pressure to be controlled can be correspondingly increased. By having the upper pipe extended into the container, such a distance that the annular space around the downwardly extending pipe portion is sufficient to contain all of the mercury, it is evident that the apparatus can be handled without the exercise of any considerable care, for the reason that the mercury will not spill out under such handling. The reentrant pipe 15 also guards against the escape of mercury or other liquid whenever the parts are subjected to a sudden increase in pressure.

Having described the invention what is claimed as new is:

1. A low pressure and vacuum relief valve comprising; a hollow casing having an upwardly converging frusto-conical wall provided at its ends with top and bottom walls, the longitudinal axis of the frusto-conical wall being disposed vertically, a cylindrical inlet pipe extending upwardly from the bottom wall and terminating thereabove, an upwardly converging frusto-conical cup-like member having a top wall disposed on the upper end of the inlet pipe and secured thereto, the cup-like member forming a first chamber between its inner wall and the inlet pipe and a second chamber between its outer wall and the inner wall of the first named frusto-conical wall, a quantity of liquid in the housing normally submerging the lower edge of the cup-like member, thereby forming a seal between the first and second chambers, an aperture in the inlet pipe above the surface of the liquid, and a cylindrical outlet pipe secured to the upper top wall of the casing and extending downwardly into the casing with its lower end terminating above the liquid and above the cup-like member, the lower end being in communication at all times with said second chamber, the space between the outlet pipe and inner wall of the housing communicating with the second chamber and forming a reservoir of sufficient capacity to retain the liquid within the housing when it is inverted.

2. A device in accordance with claim 1 wherein the first named frusto-conical wall is provided with a transparent portion adapted to render visible the liquid in said outer chamber, the remainder of the wall being opaque.

3. A device in accordance with claim 1 wherein the outlet pipe is axially aligned with the inlet pipe, the upper end of the pipe having an axial opening therein.

4. A low pressure and vacuum relief valve comprising; a hollow casing having an upwardly ranging wall provided at its ends with top and bottom walls, an inlet pipe extending upwardly from the bottom wall and terminating thereabove, a cup-like member having a top wall disposed on the upper end of the inlet pipe and secured thereto, the cup-like member forming a first chamber between its inner wall and the inlet pipe and a second chamber between its outer wall and the inner wall of the upwardly ranging wall, a quantity of liquid in the housing normally submerging the lower edge of the cup-like member, thereby forming a seal between the first and second chambers, an aperture in the inlet pipe above the surface of the liquid, and an outlet pipe secured to the top wall of the casing and extending downwardly into the casing with its lower end terminating above the liquid and above the cup-like member, the lower end being in communication at all times with said second chamber, the space between the outlet pipe and inner wall of the upwardly ranging wall communicating with the second chamber and forming a reservoir of sufficient capacity to retain the liquid in the housing when it is inverted.

RALPH A. WITHROW.
ROBERT E. COLVARD.

REFERENCES CITED

The following references are of record in the file of this patent:

UNITED STATES PATENTS

| Number | Name | Date |
| --- | --- | --- |
| 270,034 | Edwards | Jan. 2, 1883 |
| 824,442 | Schlemmer | June 26, 1906 |
| 1,371,866 | Crompton | Mar. 15, 1921 |
| 1,977,039 | Brouse | Oct. 16, 1934 |
| 2,125,910 | Gardner | Aug. 9, 1938 |
| 2,191,458 | Duden | Feb. 27, 1940 |
| 2,252,174 | Glab | Aug. 12, 1941 |

FOREIGN PATENTS

| Number | Country | Date |
| --- | --- | --- |
| 502,434 | Great Britain | Mar. 17, 1939 |